United States Patent [19]

Roussos et al.

[11] Patent Number: 4,510,922

[45] Date of Patent: Apr. 16, 1985

[54] ENERGY STORAGE SYSTEM HAVING THERMALLY STRATIFIED LIQUID

[75] Inventors: Theodore Roussos; Ravinder K. Sakhuja, both of Lexington, Mass.

[73] Assignees: Thermo Electron Corporation, Waltham, Mass.; Thermo Electron Corporation, Waltham, Mass.

[21] Appl. No.: 456,936

[22] Filed: Jan. 10, 1983

[51] Int. Cl.³ ............................................. F24J 3/02
[52] U.S. Cl. .................................. 126/435; 126/437; 165/104.21
[58] Field of Search ............ 126/417, 430, 433, 435, 126/436, 437, 400; 165/104.21, 104.26

[56] References Cited

U.S. PATENT DOCUMENTS

| | | |
|---|---|---|
| 1,425,174 | 8/1922 | Cartter et al. |
| 4,100,756 | 7/1978 | Albertson ............................ 126/435 |
| 4,116,222 | 9/1978 | Siefried ............................... 126/435 |
| 4,123,003 | 10/1978 | Winston ............................. 126/435 |
| 4,146,087 | 3/1979 | Johansson .......................... 165/104 |
| 4,217,882 | 8/1980 | Feldman ............................. 126/433 |
| 4,248,294 | 2/1981 | Budzynski et al. ............... 165/104 S |
| 4,253,446 | 3/1981 | Muller ................................ 126/435 |
| 4,257,397 | 3/1981 | Gouyou-Beauchamps ....... 126/437 |
| 4,258,696 | 3/1981 | Gopal ................................. 126/437 |
| 4,263,961 | 4/1981 | Morawgtz .......................... 126/435 |
| 4,294,227 | 10/1981 | Kreibich ............................. 126/400 |
| 4,340,033 | 7/1982 | Stewart .............................. 126/437 |
| 4,371,029 | 2/1983 | Lindner ............................. 126/435 |
| 4,385,625 | 5/1983 | Lee .................................... 126/433 |
| 4,401,100 | 8/1983 | Slater ................................ 126/435 |

OTHER PUBLICATIONS

Colorado State University Mechanical Engineering Department, "Thermal Stratification Enhancement for Solar Energy Applications," Jul. 1977, pp. 17–20, 52–55.

Primary Examiner—Daniel J. O'Connor
Attorney, Agent, or Firm—Herbert E. Messenger; Herbert E. Messenger

[57] ABSTRACT

A thermal energy storage system is disclosed for heating a liquid and establishing and maintaining thermal stratification of the liquid in a storage tank. The tank, which may store hot water for domestic use, contains a vertical header assembly which functions to greatly reduce the momentum of incoming heated water and to transport the water up or down in the tank to a distribution level containing water of temperature equal to that of the incoming water. Positioned outside the tank is a heat pipe heat exchanger for heating storage liquid withdrawn from the tank. A solar-heated working fluid is circulated through one chamber of the heat exchanger to vaporize a heat pipe fluid. The heat pipe fluid in turn heats storage liquid pumped through a separate chamber of the heat exchanger from a lower part of the storage tank, after which the heated storage liquid is returned to the tank and distributed by means of the vertical header assembly.

3 Claims, 8 Drawing Figures

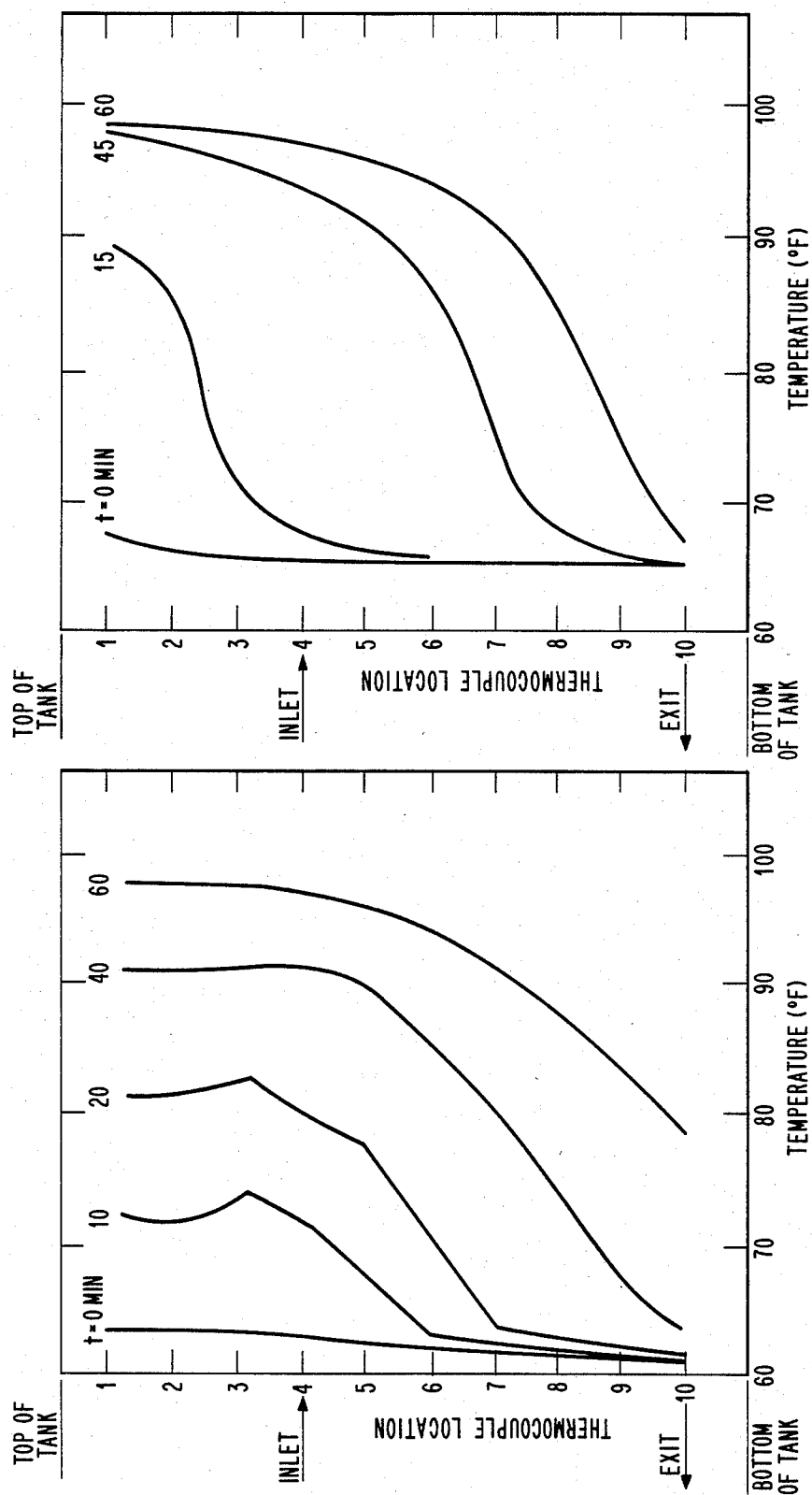

ENERGY STORAGE SYSTEM HAVING THERMALLY STRATIFIED LIQUID

BACKGROUND OF THE INVENTION

This invention relates to improved thermal energy storage systems and more particularly to systems in which portions of a stored liquid such as water are removed from a storage tank, externally heated, and reintroduced into the tank in a manner to establish and maintain a high degree of thermal stratification in the tank.

Flow tubes or pipe arrangements for maintaining zones at different temperature within a liquid storage tank are known, as described, for example, in U.S. Pat. Nos. 4,253,446; 4,146,087; and 4,340,033. In the first of these there is disclosed a domestic hot water storage tank having a wall dividing the tank into an upper, high temperature portion and a lower, low temperature portion. The low temperature portion contains a heat exchanger receiving heated fluid from a solar collector, and the upper portion contains one or more auxiliary heating devices. Controlled flow of water from one portion to another is made possible by two orifices in different quadrants of the divider wall. In U.S. Pat. No. 4,146,087 a fluid accumulation tank is described which includes a vertical ascension tube whose bottom end receives heated fluid and which has curved nozzles at selected levels to direct ascending heated fluid into the tank at levels having nearly the same temperature as the heated fluid. U.S. Pat. No. 4,340,033 discloses a liquid storage tank in which stratification is promoted by means of a temperature-operated valve which directs returning water to either of two different levels of the tank where it enters through velocity reducers consisting of enlarged horizontal pipes whose ends are truncated at an angle.

Known fluid storage systems such as those set forth in the above-referenced patents have a number of deficiencies. For example, the thermal stratification achievable in the two-zone tank system of U.S. Pat. No. 4,253,446 is rather limited, particularly since each zone includes a heating element near the bottom thereof and no device for guiding heated fluid to levels having similar fluid temperatures. Multi-zone systems utilizing valve controls are rather complex and expensive. Systems which heat a storage fluid external to a tank and have stratification promoters such as simple ascension tubes generally lack means for distributing returning fluid to either a higher or a lower level as warranted by its temperature. Known systems also lack effective measures for reducing the momentum of incoming fluid to minimize fluid mixing in a fluid storage tank. Also, prior art fluid storage systems whose primary application is the heating of potable water by heat exchange with a separate fluid such as a solar collector fluid generally do not provide efficient heat transfer while at the same time adequately separating water to be heated from the solar collector fluid, which may be toxic.

Accordingly, it is an object of the invention to provide an improved thermal energy storage system.

It is an object of the invention to provide a liquid storage tank containing simple, yet effective means for maintaining a high degree of thermal stratification.

It is an object of the invention to provide a liquid storage system wherein portions of the liquid removed from a storage tank are heated and reintroduced into the tank at levels having nearly the same temperature as that of the reintroduced liquid.

It is also an object of the invention to provide a liquid storage tank wherein the momentum of heated liquid reintroduced into the tank is reduced to low levels in order to minimize mixing of fluid in the tank.

It is also an object of the invention to provide a storage system for potable water which in addition to achieving the above objects, attains high heat transfer and double separation between the working fluid of a heater and potable water withdrawn from a storage tank for heating by the working fluid.

SUMMARY OF THE INVENTION

The invention concerns an improved thermal energy storage system for heating a fluid such as water and for storing it in thermally stratified form. The system comprises means for withdrawing fluid from a storage tank, means for heating the fluid externally of the tank, and means for returning heated fluid to the tank in a manner to establish and maintain thermal stratification of the fluid in the storage tank.

A preferred storage system according to the invention includes a fixed vertical header assembly having a perforated header pipe and a T-shaped enclosure surrounding a portion of the pipe intermediate between its upper and lower ends. The enclosure acts to receive heated storage fluid returning to the tank in a manner to greatly reduce its horizontal momentum, and then to allow the fluid to pass radially through openings into the header pipe. Thereafter the upper and lower sections of the header pipe permit the incoming fluid to rise or fall according to its density to a level in the tank containing fluid whose temperature is most nearly equal to that of the incoming fluid and to flow out of the pipe through openings near that level.

To heat storage fluid withdrawn from the tank, the energy storage system preferably includes a heat pipe heat exchanger with separate housings defining an evaporator chamber containing the evaporator portion of one or more heat pipes and a condenser chamber containing the condenser portion of the heat pipes. A solar working fluid heated in a solar collector is pumped through the evaporator cavity to vaporize a nontoxic heat pipe working fluid, and storage fluid is pumped from the tank through the condenser cavity to pick up heat and condense the heat pipe fluid. The heat exchanger is a compact, efficient unit which also provides double separation between the solar fluid and the storage fluid so that a toxic solar fluid may be safely used in the heating of potable water for storage.

BRIEF DESCRIPTION OF THE DRAWINGS

FIG. 7 shows temperature profiles achieved within a water storage tank without the vertical header assembly of the invention.

FIG. 8 shows temperature profiles achieved within a water storage tank utilizing the vertical header assembly of the invention.

DESCRIPTION OF PREFERRED EMBODIMENTS

Figure 1:
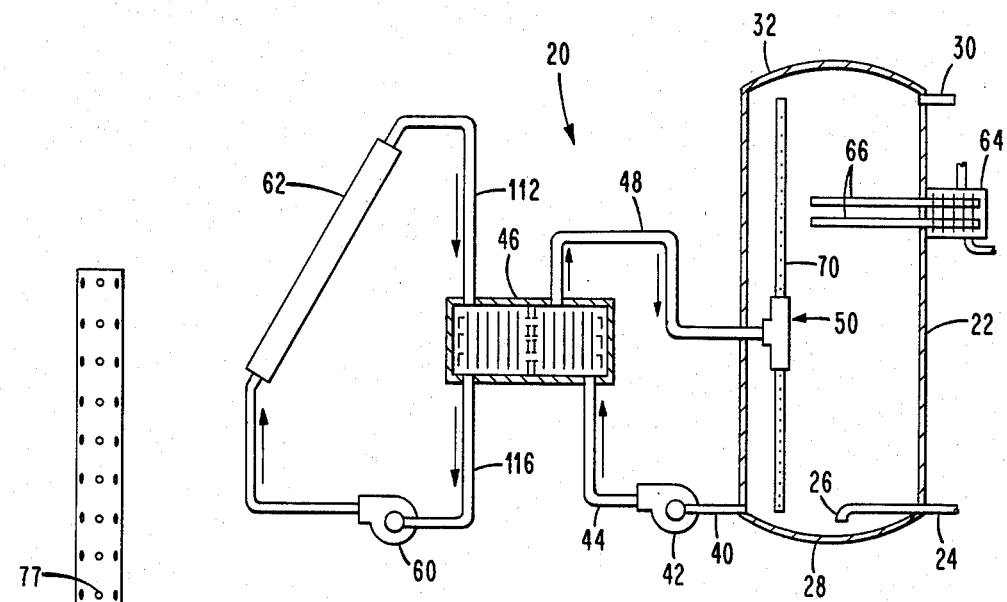
FIG. 1 is a schematic view of a preferred embodiment of the thermal energy storage system of the invention.
Figure 2:
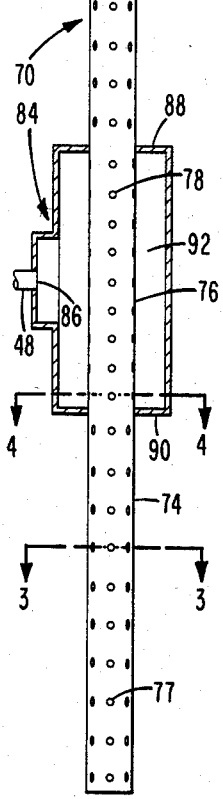
FIG. 2 is a side view, partly in section, of the vertical header assembly of the invention which operates to return fluid to a storage tank in a manner to establish and maintain thermal stratification of the fluid in the tank.

FIG. 1 illustrates an improved thermal energy storage system 20 according to a preferred embodiment of the invention. The system 20 includes an insulated tank 22 for holding a storage fluid such as water, for example potable water to be used for domestic purposes. A cold water supply pipe 24 with downwardly facing diffuser 26 extends through the tank 22 near its base 28, and a hot water discharge pipe 30 extends through the tank 22 near its top 32 to provide hot water to an external load. Also extending through the tank 22 near its base is an outlet pipe 40 for withdrawing water from the tank for external heating. The pipe 40 is connected to a pump 42 which pumps water along a pipe 44, through a portion of a heat exchanger 46 to heat the water, and along a return pipe 48 to a vertical header assembly 50 within the storage tank 22. Thermal energy for heating the water within the heat exchanger 46 may be furnished by any suitable source; a preferred source is solar energy which, as illustrated in the system 20, maybe provided by circulating a solar fluid such as water mixed with ethylene glycol from a pump 60 through a solar collector 62 and thereafter through a portion of the heat exchanger 46.

Also provided in the tank to further heat water therein, or to provide primary heating during periods when the solar collector is not operating, is an auxiliary heater such as a gas-fired heat pipe heater 64 having heat-exchanging elements 66 extending into the upper portion of the tank 22.

A key aspect of the storage system 20 is the vertical header assembly 50, which distributes water or other storage fluid returning to the tank 22 in a manner so as to establish and maintain thermal stratification of the fluid in the tank. Thermal stratification is desired because it reduces the amount of energy required to supply fluid at a predetermined elevated temperature to the outlet pipe 30 near the top of the tank 22. Thermal stratification can, for example, contribute as much as ten percent to the overall efficiency of the system 20 utilizing solar energy in the heating of storage fluid external to the tank 22 because it allows the solar collector 62 to operate at relatively low temperatures and therefore at a high collector efficiency. As a result, less use of the auxiliary heater 64 is required.

As is shown in FIGS. 1-4, the vertical header assembly 50 comprises a header pipe 70 which is positioned generally vertically in the tank 22. The header pipe 70, which may be formed of polyvinyl chloride (PVC) or other suitably corrosion-resistant material capable of withstanding the temperatures at which the storage tank operates, includes an upper section 72, a lower section 74, and a middle section 76 between the upper and lower sections. The upper and lower header pipe sections 72 and 74 have a plurality of perforations or openings 77 distributed along their length and circumference to permit the passage of fluid radially out of the pipe 70 as will be set forth in more detail hereinafter. The middle section 76 includes a plurality of openings 78 to permit passage of fluid radially into the pipe 70. The openings of each section may be of equal size, or the openings 78 of the section 76 may be somewhat smaller to suitably restrict the passage of fluid into the pipe 70 and to assist in reducing the momentum of fluid as it is returned to the tank after external heating.

Figure 3:
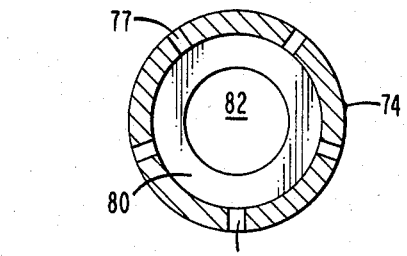
FIG. 3 is a cross-sectional view of the header pipe of FIG. 2 taken along the line 3—3.
Figure 4:
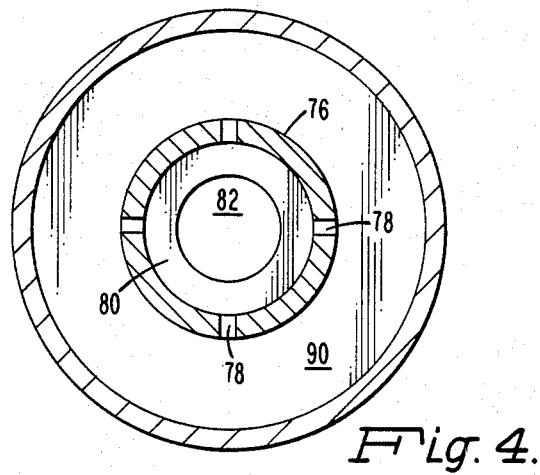
FIG. 4 is a cross-sectional view of a section of the vertical header assembly shown in FIG. 2 taken along the line 4—4.

The upper and lower ends of the pipe 70 preferably are either open or contain plugs such as the plug 80 illustrated in FIG. 3 having one or more openings such as the opening 82 therein. One advantage of providing fluid communication through at least the top end of the pipe 70 is that any air which enters the pipe 70 through the return pipe 48 will rise freely along the upper section 72 and pass out of the top end of the pipe without disturbing operation of the header pipe assembly 50.

A T-shaped enclosure 84 surrounds the middle section 76 and has a single opening 86 therein for receiving storage fluid from the pipe 48 as the fluid is returned to the tank 22 after external heating. The upper end 88 and lower end 90 of the enclosure 84 are sealed around the section 76 to form a cavity 92 having a generally annular cross-section. Fluid which is pumped through the return pipe 48 enters the cavity 92 through the opening 86, loses most of its horizontal momentum in striking the inner walls of the enclosure 84 and the outer wall of the section 76, and then passes radially inward through the perforations 78 of the section 76. Thereafter, having now lost all of its horizontal momentum, the storage fluid develops vertical momentum upward or downward depending on its density relative to the density of the fluid surrounding the section 76. If the temperature of the incoming fluid is greater than that of the surrounding fluid, the incoming fluid will rise and pass into the upper section 72 of the header pipe 70; if lower, then the incoming fluid will sink into the lower section 74. The fluid then travels in the upper or lower section to a level where it is in temperature equilibrium with the fluid surrounding the pipe 70. At this point, the vertical momentum of the fluid decreases to zero, and the higher pressure of the fluid in the pipe 70 relative to that in the surrounding fluid causes fluid to pass out of the pipe 70 through the perforations 77 nearest the attained level.

The header pipe assembly 50 thereby functions to deliver fluid to the tank 22 at levels to establish and maintain a high degree of thermal stratification in the tank whether the incoming fluid has a higher or lower temperature than the tank fluid surrounding the section 76. The T-shaped enclosure 84 and the header pipe 70, by greatly reducing the momentum of the incoming fluid, also minimize kinetic currents which might otherwise be induced by the incoming fluid and lead to mixing and de-stratification of the fluid in the tank. Also, this arrangement requires the returning fluid to travel only a relatively short distance before attaining its level of temperature equilibrium so that only a small volume of fluid need be displaced and thus mixing is minimized.

Figure 5:
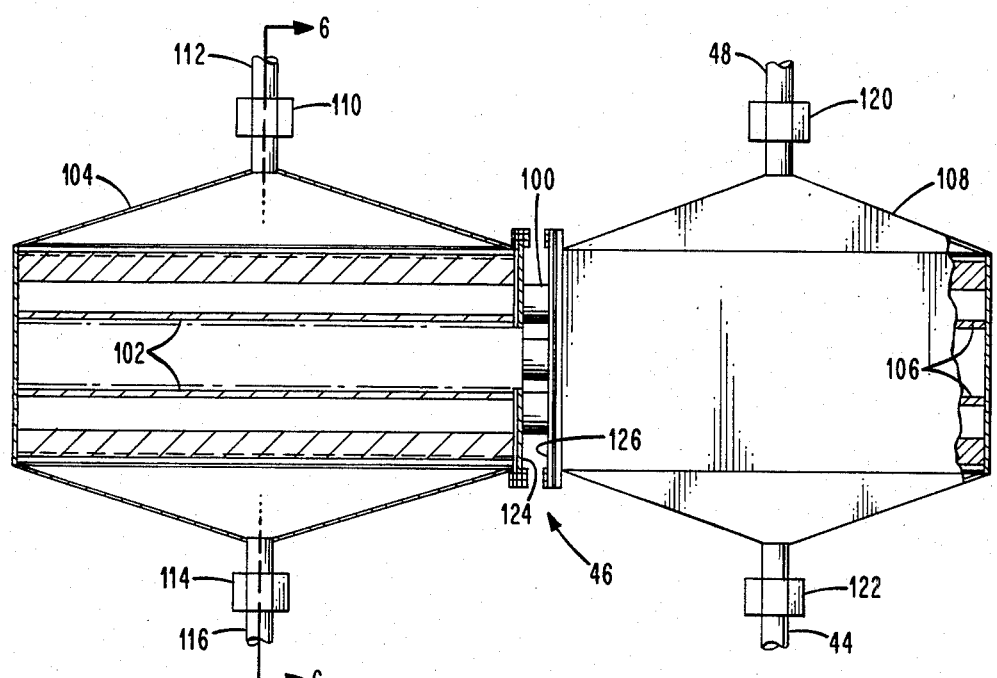
FIG. 5 is a side view, partly in section, of a heat pipe heat exchange useful in transferring heat from the working fluid of a heat source such as a solor collector to a storage fluid.
Figure 6:
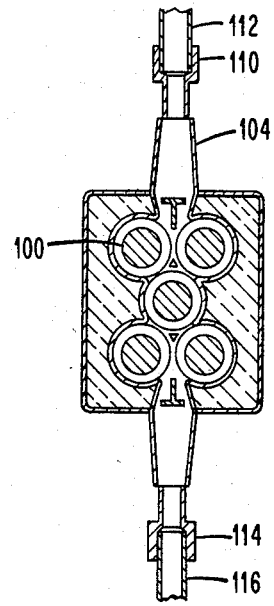
FIG. 6 is a view taken along the line 6—6 of FIG. 5.

FIGS. 5 and 6 show a preferred heat exchanger 46 for transferring solar energy to a fluid such as domestic hot water used for energy storage in the system 20 of the invention. The heat exchanger 46 includes a plurality of heat pipes 100 each of whose evaporator sections 102 lie within an evaporator housing 104 and each of whose condenser sections 106 lie within a condenser housing 108. Sealed within each of the heat pipes 102 is a nontoxic, readily-vaporizable working fluid such as water or ethanol. The heat pipes 100, which are five in number in the arrangement illustrated in FIGS. 5 and 6, are made of a conductive material such as copper. They may contain external fins for increasing their surface (heat transfer) area and may also have internal fins defining grooves containing wick material for transporting condensed working fluid from the condenser section 106 to the evaporator section 102 of a heat pipe.

The evaporator housing 104 of the heat exchanger 46 includes an inlet 110 connected to a pipe 112 carrying solar working fluid from the solar collector 62 to the heat exchanger 46. An outlet 114 is connected to a pipe 116 for returning solar working fluid to the pump 60 for circulation through the collector 62. The inlet 110 and outlet 114 are arranged with respect to the heat pipes 100 such that solar working fluid may enter the heat exchanger 46 through the inlet 110, circulate in contact with the heat pipe evaporator sections 102 to transfer heat to and vaporize a nontoxic working fluid such as water sealed within the heat pipes, and flow out through the outlet 114. A similar inlet 120 and an outlet 122 are provided in the condenser housing 108 for permitting circulation of the storage fluid (water) in contact with the heat pipe condenser sections 106 to heat the storage water and condense the heat pipe working fluid. As is indicated in FIG. 5, the inlet 120 and the outlet 122 are preferably located on opposite sides respectively of the housing 108 from the inlet and outlet of the evaporator housing 104 so that the heat exchanger 46 operates as a counterflow device.

In addition to achieving efficient transfer of heat from the solar working fluid to the storage fluid through the use of a compact arrangement of high-performance heat pipes, the heat exchanger 46 also provides double separation between the solar working fluid, which may be toxic, and the storage fluid, which in certain preferred systems is potable water. As is shown in FIG. 5 the heat exchanger housings 104 and 108, though adjacent, are separated from each other by opposed, spaced-apart end plates 124 and 126 through which the heat pipes 100 extend. Intermixing of the solar fluid and storage water therefore cannot occur in the heat exchanger 46 unless leaks develop both in heat pipe sections within the evaporator housing 104 and in heat pipe sections within the condenser housing 106.

FIGS. 7 and 8 illustrate temperature profiles determined from two tests conducted to determine the effectiveness of the vertical header assembly 50 of the thermal energy storage system 20 in establishing and maintaining thermal stratification in the storage tank 22. The plotted curves of FIG. 7 were obtained from temperature measurements in a water storage tank having no stratification promoters. Those of FIG. 8 were obtained from temperature measurements in a tank containing the above-described vertical header assembly 50. In the experiments there was used as a storage tank 22 an 82 gallon steel tank having a length to diameter ratio of about 2.3. The tank was coated internally with epoxy to reduce corrosion and was insulated with a six-inch outer blanket of fiberglass. The vertical header assembly 50 utilized in the test resulting in the temperature profiles of FIG. 8 included a header pipe 70 of 1½ inch inner diameter whose upper and lower sections 72 and 74 had, at axial locations spaced about 1¼ inches apart, four openings one-half inch in diameter equally spaced about its circumference. In the middle section 76 there were, at axial locations spaced about ¾ inch apart along its 8½ inch length, five openings one-quarter inch in diameter equally spaced about the circumference of the pipe. The T-shaped enclosure 84 surrounding the section 76 included a vertical leg having an inner diameter of about three inches.

Temperature measurements where made at the beginning of the test (t=0) when the storage tank was essentially isothermal and at various times as cold water was withdrawn from the tank 22 through the outlet pipe 40 at a constant rate of one gallon per minute and as water heated to a temperature of 100° F. was returned to the tank 22 through an inlet located approximately one-third of the distance from the top to the bottom of the tank. FIG. 7 shows that a limited amount of thermal stratification was obtained without the vertical header assembly 50. However, after one hour had passed from the beginning of the test, a considerable amount of mixing had occurred as indicated by the small difference in temperature (about 20° F.) between storage water near the top of the tank and storage water near the bottom. By contrast, in test for which the vertical header assembly 50 was installed in the tank as shown in FIG. 1 and connected to the inlet at a position about one-third of the distance from the top to the bottom of the tank, a high degree of thermal stratification was achieved and maintained as indicated in FIG. 8.

The stratification achieved in the tests conducted without use of the vertical header assembly 50 likely could have been improved by relocating the inlet for returning storage water closer to the top of the tank. The probable improvement in stratification would occur as the result of a decrease in mixing formerly caused by the jet of water freely entering the tank and entraining cold water as it rose towards the top of the tank. However, such an arrangement would still lack the capability of the vertical header assembly 50 of substantially reducing the momentum of storage water prior to contact with the main body of water in the tank. Moreover, it would not, as does the vertical header assembly, provide flexibility in achieving and maintaining thermal stratification during typical operating situations where temperature and flow rate of the returning storage fluid may vary with time.

While the invention has been shown and described with reference to preferred embodiments thereof, it is apparent that the fluid thermal stratification system described herein may be embodied in other specific forms without departing from the spirit or essential characteristics of the invention. The scope of the invention is indicated by the appended claims, and all changes which come within the meaning and range of equivalency of these claims are intended to be embraced therein.

What is claimed is:

1. Apparatus for achieving thermal stratification of potable water comprising:
   a tank for storing water;
   means for withdrawing water from said tank;
   a solar heat exchange system for heating water withdrawn from said tank including a solar collector, heat exchange means for permitting heat transfer between a solar fluid and water circulated therethrough and for providing double-wall-separation between said solar fluid and said water during said heat transfer, means for circulating water withdrawn from said tank through said heat exchange means, and means for circulating a solar working fluid through said solar collector and thereafter through said heat exchange means; and a header assembly for returning water from said heat exchange means to said tank at a level containing water whose temperature most nearly approximates the temperature of the returning water, said header assembly including an inlet extending through a wall of said tank, a vertical header pipe whose wall has a plurality of perforations distributed along its length and about its circumference, and wall means enclosing a portion of said header pipe intermediate between its upper and lower ends and forming a cavity for receiving returning water from said inlet.

2. Apparatus as in claim 1 wherein said heat exchange means comprises:
a first housing defining an evaporator chamber;
a second housing spaced from said first housing and defining a condenser chamber; and
a heat pipe extending through a wall of each of said housings and having an evaporator section within said first housing and a condenser section within said second housing, said heat pipe having a heat pipe working fluid sealed therein.

3. Apparatus as in claim 2 wherein said pipe working fluid comprises water.

* * * * *